Jan. 15, 1929.
S. J. FINN
1,698,785
WASHER STACKING MACHINE
Filed Jan. 24, 1927
2 Sheets-Sheet 1
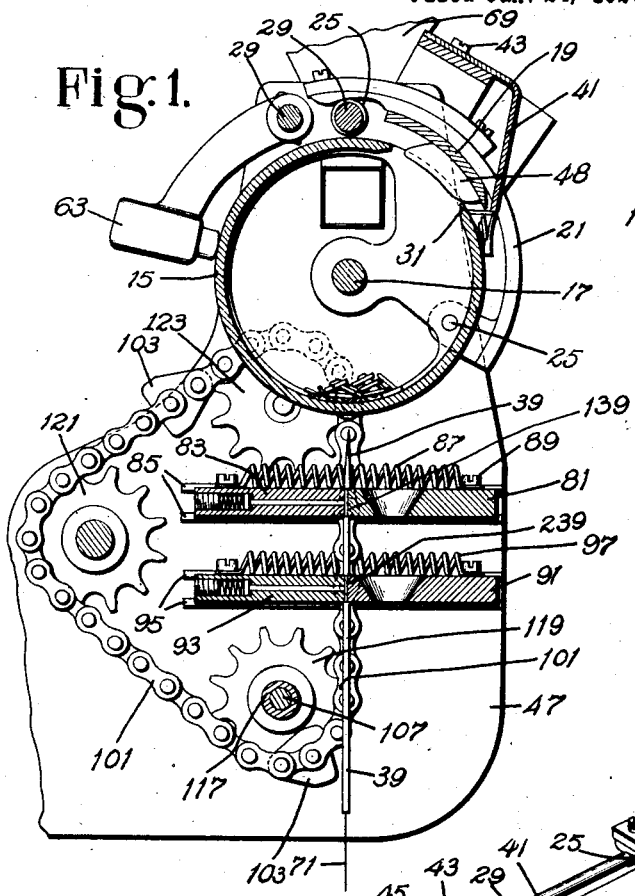
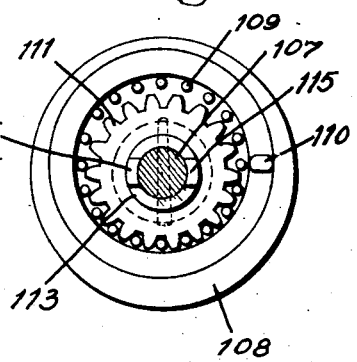
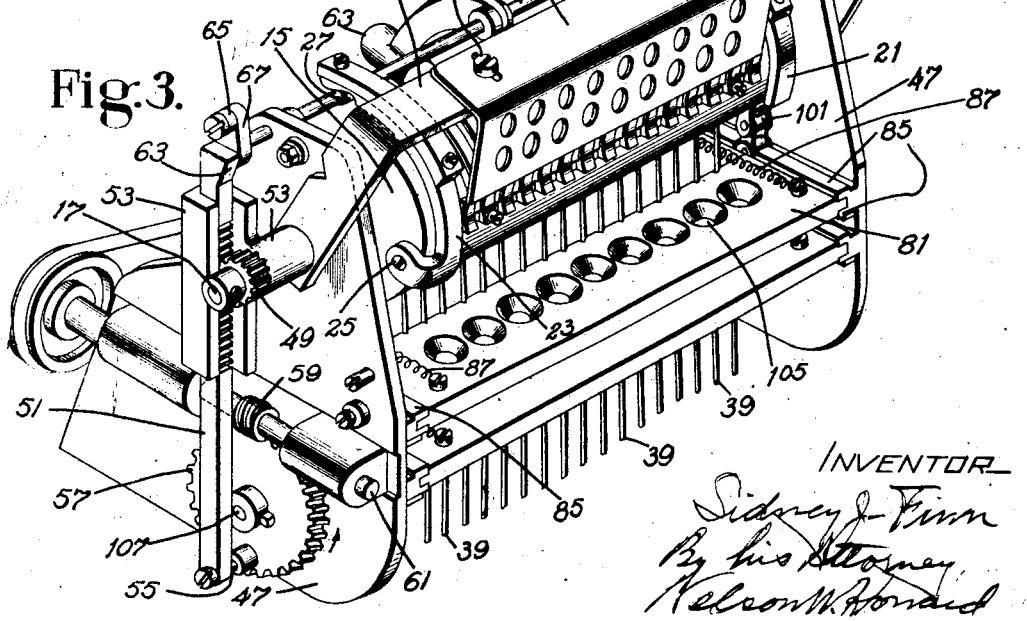
INVENTOR
Sidney J. Finn
By his Attorney
Nelson W. Howard

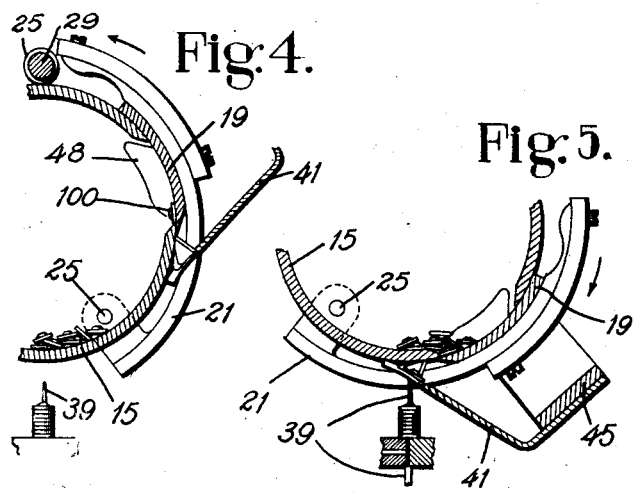

Patented Jan. 15, 1929.

1,698,785

UNITED STATES PATENT OFFICE.

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY.

WASHER-STACKING MACHINE.

Application filed January 24, 1927. Serial No. 163,079.

This invention relates to the stacking of washers and similar articles and is herein illustrated as embodied in a machine for threading dished rubber-heel washers in nested relation upon elongated impaling members preparatory to filling the tubular magazine of a hand tool by manipulation of which the washers may be placed one by one upon the pins of a rubber-heel mold.

Rubber heels commonly have embedded in them a series of small washers, the holes through which register with the nail holes in the heel. These washers are commonly dished, the open sides thereof being faced toward the tread face of the heel so that the nails, when driven, will be guided into the nail holes. The molds in which rubber heels are made comprise base plates having a plurality of upstanding pins which form the holes in the finished heels. Upon these pins the washers are placed before the so-called "biscuits" of rubber are put into the mold to be vulcanized. One type of washer-placing device comprises a hand tool adapted to be moved back and forth over a heel mold after the manner of a carpenter's plane, said tool comprising a tubular magazine for washers and means for feeding washers one at a time to successive mold pins, such a device being disclosed, for example, in United States Patent No. 1,584,477, granted May 11, 1926, upon an application filed in the name of Schrock.

The general object of the present invention is to provide improved means for stacking washers and similar articles, as well as means for stacking them in such manner that a stack of the desired height may readily be transferred to the tubular magazine of a washer-placing device or to any suitable receptacle.

As has been stated above, heel washers are commonly of dished or conical shape and should, therefore, be stacked in nested relation. According to one feature of the invention there is provided a receptacle for a mass of washers, a member having an edge the thickness of which is substantially equal to the thickness of the edge of a washer, means for moving said member through the lower portion of the mass and then upwardly to separate some of the washers from the mass, means for supporting the washers thus separated on one side only so that presently only washers which have their open sides in contact with the support will remain on said edge, and means for stacking these separated washers. In the illustrated embodiment of the invention, the hopper is a cylindrical oscillating one having an opening through a wall thereof extending lengthwise of the cylinder, one edge of said opening having a thickness substantially equal to the thickness of the edge of a washer, a cover or gate being provided for closing the opening and thereby supporting the washers on one side only during the upward swing of said edge. At the proper time the gate is opened to permit the washers to be delivered through the opening into holders from which they are presently removed by a stationary impaling and receiving member upon which they are threaded.

The machine illustrated as embodying the present invention is intended to be run continuously to provide a plurality of stacks of washers from any one of which a stack of the desired height may be transferred to the tubular magazine of a washer-placing device such, for example, as one of the type referred to above. In order that there may be a large supply of stacked washers always on hand it is desirable to support the washer impaling and receiving members in such manner that, while their upper pointed ends are held in fixed position to impale washers, their lower ends may extend down an indefinite distance so that stacks of considerable height may be made. According to another feature of the invention, the upper portion of each impaling member is engaged in two spaced localities by two pairs of grippers, means being provided for opening and then closing first the upper pair and then the lower pair. When the upper pair is open, the washers above that pair slide down the impaling member and rest upon the lower pair, the impaling member being at that time held in fixed position by the lower pair. The upper pair then closes to hold the impaling member while the lower pair opens to permit the washers to slide down past the lower pair, after which the lower pair closes, and the cycle is repeated. In this way a supply of washers, endless except for the length which it is practical to give to the impaling members, may be built up.

The tubular magazines of washer placing devices of the type above-mentioned are comparatively short, and it is, therefore, desirable to be able to permit only such part of the stack of washers thereon as will be sufficient to fill the magazine to slide off from the lower portion of one of the long impaling members. According to another feature of the invention, the lower portion of each impaling member is jointed to the upper portion and rests at its lower end upon a support, which also supports the stack of washers, and this lower portion is of a selected length which, in the illustrated machine, is substantially equal to the height of the tubular magazine of a washer placing device. When, therefore, it is desired to fill such tubular magazine, the lower portion is swung to one side from off its support and its lower end directed into the tubular magazine. Such swinging produces a bend at the joint in the impaling member which prevents washers sliding down past it, so that only those washers below the joint are delivered.

These and other features of the invention, including certain details of construction and combinations of parts, will be described as embodied in an illustrative machine and pointed out in the appended claims.

Referring now to the accompanying drawings,

Figure 1 is a vertical transverse section through a machine in which the present invention is embodied, Figure 2 is a vertical transverse section taken through the shaft 107 showing the reduction speed gearing, Figure 3 is a perspective of the machine.

Figures 4 to 7 inclusive are sections showing different positions of the hopper and associated parts, Figures 8 and 9 are sections showing the mechanism for holding the impaling members, Figure 10 is a perspective showing more particularly the compartments or holders on the outer wall of the hopper, and Figure 11 is a perspective of a portion of the under side of the gate.

A cylindrical hopper 15 is fast to a shaft 17 which is continually rocked, by mechanism presently to be described, so as to cause the hopper to oscillate between the positions shown in Figures 1 and 7. The hopper has in its side an opening or passageway extending substantially throughout the whole length thereof with which a gate or cover 19 cooperates. This gate is carried by two arc-shaped arms 21, 23 which are pivoted at one of their ends to the hopper about the alined axes of screws 24, the gate being urged at all times into closed position by tension springs (not shown) which are attached at one end to the arms 21, 23 and at the other to the hopper. The free ends of the arms 21, 23 carry cams which are adapted to run up on rollers 25, 27, carried by a small rock-shaft 29, so as to open the gate just before the hopper reaches the position shown in Figure 1. For convenience, this position (Fig. 1) will be termed the upper position of the oscillating hopper and that shown in Figure 7, the lower position, it being understood that the movement from upper to lower position is clockwise (Figs. 5 and 6) and from lower position to upper position is counter-clockwise (Fig. 4). The edge 31, which forms one boundary of the opening through the wall of the hopper, has a thickness, due to the beveling of the wall of the hopper, which is substantially equal to the thickness of the edge of a washer. Assuming now that the hopper is in the position shown in Fig. 7 and is rocked upwardly in a counter-clockwise direction into the position shown in Fig. 4, a series of washers, one of which is shown in that figure at 100, will rest upon the edge 31 of the hopper with its concave face toward the gate 19. There may not be a continuous row of washers on the edge 31, but all the washers which are on that edge will be in the position shown with their convex faces pointing toward the interior of the hopper. As the hopper continues its upward oscillation the cams on the arms 21, 23 encounter the rolls 25, 27 and open the gate whereupon the washers which are resting as shown in Fig. 4 upon the edge 31 escape from the hopper and each slides, convex side down, into one of a series of compartments or holders, shown best in Figure 10, located on the outside of the hopper adjacent to the edge 31.

Each compartment or holder comprises what will be termed a bottom wall composed of adjacent portions of spaced plates 33, side walls or partitions 35 and an inclined wall 37. Each washer, when the gate 19 is opened, slides down the inclined wall 37 and comes to rest in the position indicated at 100 in Figure 10 with its convex face resting upon said wall. The hopper now swings downward through the positions shown in Figures 5 and 6 to its lower position (Fig. 7); and during this movement, the washer first tips over until its concave face rests upon the bottom of the compartment (formed by the spaced plates 33) and is then threaded upon one of a series of impaling pins 39 which are so held that their pointed upper ends pass through (so to speak) the passageways between the plates 33 and enter the holes in the washers.

Unless some provision were made to hold each washer on the bottom of its compartment, it would slide off said bottom during the downward swing of the hopper. There is accordingly provided a retainer in the form of an angle plate 41, which is adjustably fastened by screws 43 to a carrier 45, said carrier being a U-shaped bar the ends of the arms of which are pivoted on the shaft 17. This retainer is so located that its operative edge is engaged by the alined upper edges of the plates 33, when the hopper is swung up, so that the retainer swings up with the hopper as shown in Figures 1, 3 and 4. When the hopper swings down, the retainer falls by gravity until the arms of the U-shaped bar 45 encounter the edges of upright plates 47, which form part of the frame of the machine.

This happens shortly before the hopper reaches the position shown in Figure 5 so as to hold back the retainer and to permit the washer to be threaded upon a pin 39 and removed from its compartment. The retainer 41, it should be noted, is thicker than the plates 33 so that part of its edge engages the edges of the washers and thus prevents the washers from sliding out of their compartments until the proper time. The retainer remains in the position in which it is shown in Figures 5, 6 and 7 until, on the upward swing of the hopper, the alined edges of the plates 33 engage it again and carry it up once more. In order to ensure that the washers picked up by the edge 31 during the upward swing of the hopper shall each be in a position lengthwise of said edge to slide into one of the compartments or holders, there are provided on the under side of the gate 19 a series of partitions 48 which are in line with the side walls 35 of the compartments.

The hopper is oscillated through a pinion 49 (Fig. 3), which is fast to the shaft 17, by means of a rack 51. This rack is slidable in a guide 53 having integral with it a hub which is pivoted on said shaft, the rack being oscillated and reciprocated by a crank-pin 55 carried by a gear 57, said gear meshing with a worm 59 on a shaft 61 which is rotated by means of a belt from any suitable source of power.

This rack also serves to actuate a hammer 63 (Figs. 1 and 3) to cause the hammer to strike a blow upon the side of the hopper, once during every oscillation of the hopper. To this end the upper end of the rack 51 has an inclined cam face 64 which is adapted to cooperate with a roll 65 on a crank arm 67, said crank arm being fast to the shaft 29 to which the stem of the hammer is fastened. Referring more particularly to Figure 3 and assuming that the gear 57 is revolving in a counterclockwise direction as indicated by the arrow, the upper end of the rack, during the first half of a revolution, will swing back until it clears the roll 65 and at the same time rise above the level of the roll; and, during the last half of the revolution, the upper end of the rack will swing forward and down. During this forward and downward movement of the upper end of the rack, the cam face 64 will first engage the roll 65 to rock the rock-shaft 29 in a direction to raise the hammer 63 and will then pass from engagement with the roll to permit the hammer to fall into the position best shown in Figure 1.

A tension spring may be attached at one end to the hammer and at the other end to the frame of the machine, if desired, to increase the force of the blow of the hammer.

In order to permit the operator to supply washers to the hopper from time to time, there is provided a funnel 69 which communicates, when the parts are in the positions shown in Figures 1 and 3, with an opening in one end of the hopper.

As has been explained above, the illustrated machine is adapted to thread washers upon washer-impaling and receiving members from which they may readily be slid into the tubular magazines of devices for placing the washers upon the pins of rubber heel molds. Referring now more particularly to Figure 9, each pin 39 has depending from its lower end a wire 71 which may be of any desired length and preferably not less than fifteen inches; and the lower end of the wire is attached to the upper end of a short pointed member 75 hinged at 77 to a slender rod 73. The rod 73 is made of a length a little less than that of the tubular magazine of the washer-placing device which has been referred to above, being in the neighborhood of seven or eight inches, while the pointed member 75 is very short, its function being merely to permit the hinge or joint 77 to be introduced into the construction. Each pin 39 is held in position by means which will presently be described; and each rod 73 rests upon the bottom of a slot 79 in a stationary support 80, it being understood that there is a slot to receive the bottom of each rod. These slots are open at one end so that, when it is desired to fill the tubular magazine of the washer-placing device, the lower end of any rod may be swung out of its slot and the washers upon it allowed to slide into the magazine. After the washer stringing machine has been running for a short time, there is a comparatively long stack of washers threaded upon each impaling and receiving member. When now it is desired to fill the tubular magazine of the washer-placing device, the operator holds this device with one hand while with the other hand he grasps the lowermost washers on one of the rods 73, swings the rod out of its slot, places the end of the rod in the tubular magazine and lets go of the washers. The purpose of the flexible wire 71 and the joint 77 will now be clear. The wire permits the rod 73 to be slid out of its slot 79 and moved into register with the tubular magazine of the washer-placing apparatus: the joint 77 serves as a sort of measuring device since, as soon as the rod 73 is swung out of its slot, the bend at the joint separates the washers on the rod 73 from those on the wire 71 and the member 75 and prevents any washers from sliding down from the member 75 to the rod 73. There is thus delivered to the tubular magazine of the washer-placing apparatus a measured number of washers just sufficient to fill said magazine to the desired height.

It is obvious that the pins 39 must be held at all times in position to receive washers from the oscillating hopper and must also be held in such manner that an endless supply of washers may be threaded upon the pins and slide down upon the wires 71 and rod 73. To this end the following mechanism is provided. Referring more particularly to Figures 1, 8 and 9, each pin 39 has two portions of reduced diameter, an upper portion 139 and a lower portion 239. The upper portion 139 is normally engaged by two slide members or grippers 81, 83, horizontally slidable in guides 85 rigid with the upright plates 47, which are part of the frame of the machine, said slide members being continuously urged toward each other by tension springs 87 the opposite ends of which are fastened by screws 89 respectively to the slide members 81, 83. The lower portion of reduced diameter 239 is also adapted to be engaged by slide members or grippers. These slide members 91, 93 are substantially like the slide members 81, 83, being mounted in horizontal guides 95 carried by the frame of the machine and being urged toward each other by tension springs 97. In the operation of the machine, as soon as a certain number of washers have been collected upon the pointed upper ends of the pins 39, the slides 81, 83 are moved apart (see Fig. 8) to permit these washers to slide down until they rest upon the slides 91, 93. The slides 81, 83 are then brought together again by the springs 87, and the slides 91, 93 moved apart (see Fig. 10) to permit the same washers to slide down upon the wires 71 and rod 73. It will thus be seen that the pins are always engaged and held in position by at least one pair of slides or grippers but that, nevertheless, groups of washers slide intermittently down the pins and collect upon the wires 71 and rod 73. In order to ensure that none of the pins 39 shall ever be completely released, the slides 83 and 93 are provided respectively with spring-pressed slender plungers 98, 99 which normally extend slightly beyond the gripping faces of said slides.

The periodic alternate opening first of the slides 81, 83 and then of the slides 91, 93 is effected by two endless chains, one of which is shown at 101 in Figures 1, 3 and 9, each of which carries two cams 103, it being understood that the cams of one chain are respectively in line horizontally with the corresponding cams of the other chain so that the cams act in pairs, one at each end of the slides, to spread the slides apart. The chains pass through passageways formed by registering slots in the respective slides, said passageways being of a size sufficient to permit the chains to pass freely through them but insufficient to permit the free passage of the wedge-shaped cams. In the operation of the machine it occasionally happens that a washer fails to be threaded upon its pin 39 and falls upon the plate 81. In order to prevent washers from accumulating upon this plate, or upon plate 91, which is beneath it, a row of holes 105 is formed in the plate 81 and a similar row in plate 91 so that any washers which are not threaded upon the pins may fall through the holes to the bench upon which the machine rests.

The chains, one of which is shown at 101, are driven continually from the shaft 107 to one end of which the gear 57 is fast. The other end of the shaft has fast to it a housing 108 having in it an eccentrically located socket to receive an internal, circular rack, the teeth of which are in the form of pins 109. This internal rack is connected to the frame of the machine by a member 110, the round stem of which extends loosely into a cylindrical socket in the internal rack while its outer end is slidable horizontally in a slot in the frame of the machine. This internal rack drives a pinion 111 having a sleeve 113 which is loose on the shaft 107 and has projecting lugs 115 which fit into the recesses (not shown) in a sleeve 117 (Fig 1) to which the sprocket wheels 119 are fast. This reduction gearing will not be described further since the details of its construction form no part of the present invention. It may be stated, however, that the particular gearing moves the chains 101 intermittently with dwells between the movements, the timing being such that the cams 103 are moved down to spread apart the grippers 81, 83 (Fig. 9) and are then held stationary for a short interval to permit the grippers 81, 83 to close before the cams are moved farther down to spread apart the grippers 91, 93 (Fig. 9). The chain 101, which is shown in Figure 1, runs around the driver sprocket 119 and around two idle sprockets 121, 123. The companion chain (not shown) runs around three sprockets at the other end of the machine which are alined respectively with the sprockets 119, 121 and 123.

Assuming now that the hopper 15 has in it a supply of washers and is in its lower position, as shown in Figure 7, the operation of the machine is as follows: The hopper swings up in a counter-clockwise direction. During the first part of this upward swinging, a row of washers all facing in the same direction (see Figure 4) is picked up by the edge 31; and, during the latter portion of the upward swinging movement, the gate 19 is opened to permit these washers to slide each into one of the compartments formed on the outside of the wall of the hopper, one such washer being shown in dotted lines in Figure 10. During the upward swing of the hopper, the upper alined edges of the plates 33 have engaged the edge of the retainer 41 which still rests by gravity upon said edges. During the downward swing of the hopper each washer tips over in its compartment so as to rest with its concave face upon the plates 33 as shown in Figures 4 and 5. Just as the washers reach a position to be engaged by the pins 31, the movement of the retainer 41 is arrested; and, as the downward swing of the hopper is completed, the washers are threaded upon the pins. This cycle is repeated until small stacks of washers have collected upon the upper ends of the pins. One pair of wedge-shaped cams 103 now passes between the plates 81, 83, as shown in Figure 8, to spread the plates apart and permit the small stacks of washers to slide down upon the pins 39 and come to rest upon the plates 91, 93. As the cams 103 continue their downward movement, they presently pass from between the plates 81, 83, whereupon those plates once more come together to engage and hold the pins 39. Further downward movement of the cams 103 spreads apart the plates 91, 93 and permits the small stacks of washers to slide down the wires 71 as shown in Figure 9. The pair of cams 103 then pass from between the plates 91, 93 whereupon these plates close once more upon the pins 39.

In this way, stacks of washers are collected which rest upon the support 80 (Fig. 9) and extend up on the wires 71. When, now, it is desired to fill the tubular magazine of a washer-placing tool, the tool is held in one hand by the operator while, with the other, he grasps the lowermost washer or washers on one of the rods 73, swings the lower end of the rod out of its slot 79, inserts this end in the open upper end of the tubular magazine and releases the washers which slide down off the rod 73 into the magazine. As has been explained above, when the lower end of a rod 73 is swung out of its slot, all the washers above the joint 77 are prevented from sliding down past that joint, so that only the washers on the rod 73 are delivered into the magazine of the washer-placing device. The illustrated machine is intended to be run continuously and to furnish a supply of stacked washers sufficient to take care of several devices for placing the washers upon the pins of heel molds.

Although the invention has been set forth as embodied in a particular machine it should be understood that the invention is not limited in the scope of its application to the particular machine which has been shown and described.

In order to promote brevity as well as to point out a specific use of the machine, the handling of washers has been described and will be referred to generally throughout the claims, but without intending to exclude other articles which may be adapted to be handled.

Having thus described my invention, what I claim as new and desire to secure by Letters Patent of the United States is:

1. A machine for separating dished washers from a heterogeneously arranged pile thereof, having in combination, a member having an edge the thickness of which is substantially equal to that of the edge of a washer, means for moving said member through the pile of washers and then upward, means movable with said member for supporting the washers on one side only, during said movement whereby only those washers which have their open sides toward the supporting means are picked up by and remain upon said edge, and means for moving said movable means from washer-supporting position after said member has been moved upward, thereby permitting the picked-up washers to drop from said edge for delivery.

2. A machine for separating dished washers from a heterogeneously arranged pile thereof, having in combination, a member having an edge the thickness of which is substantially equal to that of the edge of a washer, means for moving said member through the pile of washers and then upward so as to collect washers in substantially upright position upon the edge of said member, means movable with said member for supporting the washers on one side only during said movement whereby only those washers which have their open sides toward the supporting means are picked up by and remain upon said edge, means for moving said movable means from washer-supporting position after said member has been moved upward, thereby permitting the picked-up washers to be dropped from said edge, and means for impaling said dropped washers.

3. A machine for separating dished washers from a heterogeneously arranged pile thereof, having in combination, a hopper for washers, said hopper having a passageway through its wall, a washer holder located outside the hopper and secured thereto adjacent to the passageway, means for delivering washers in succession through the passageway to the holder, and means for successively engaging the washers so delivered and arranging them in stacked relation.

4. A machine for separating dished washers from a heterogeneously arranged pile thereof, having in combination, a hopper for washers, said hopper having a passageway through its wall, a washer holder located outside the hopper and secured thereto adjacent to the passageway, means for delivering washers in succession through the passageway to the holder, and means for successively impaling the washers so delivered.

5. A machine for separating dished washers from a heterogeneously arranged pile thereof, having in combination, a hopper for washers, said hopper having a passageway through its wall, a washer holder located adjacent the passageway on the outside of the wall of the hopper and secured thereto, means for delivering a washer through the passageway to the holder, and means for successively engaging the washers after they have been delivered to the holder and arranging them in stacked relation.

6. A machine for separating dished washers from a heterogeneously arranged pile thereof, having in combination, a hopper for washers, said hopper having a passageway through its wall, a washer holder located adjacent the passageway on the outside of the wall of the hopper and secured thereto, means for delivering a washer through the passageway to the holder and means for successively impaling the washers after they have been delivered to the holder.

7. A machine for separating dished washers from a heterogeneously arranged pile thereof, having in combination, a hopper for washers, said hopper having a passageway through its wall, a gate for said passageway, a washer holder located outside the hopper adjacent to the passageway, and means for periodically opening the gate and delivering washers discontinuously through the passageway to the holder.

8. A machine for separating dished washers from a heterogeneously arranged pile thereof, having in combination, a hopper for washers, said hopper having a passageway through its wall, a gate for said passageway, a washer holder located outside the hopper adjacent to the passageway, means for periodically opening the gate and delivering washers discontinuously through the passageway to the holder, and means for arranging the washers so delivered in stacked relation.

9. A machine for separating dished washers from a heterogeneously arranged pile thereof, having in combination, a hopper for washers, said hopper having a passageway through its wall, a gate for said passageway, a washer holder located outside the hopper adjacent to the passageway, positive means for opening the gate and delivering washers in succession through the passageway to the holder, and means for successively impaling the washers.

10. A machine for separating dished washers from a heterogeneously arranged pile thereof, having in combination, a rotatably mounted hopper for washers, said hopper having a passageway through its wall, means for rotating said hopper, a gate for said passageway, a washer holder located on the outside of the wall of the hopper adjacent the passageway, and means for opening the gate and delivering washers in succession through the passageway to the holder.

11. A machine for separating dished washers from a heterogeneously arranged pile thereof, having in combination, a rotatably mounted hopper for washers, said hopper having a passageway through its wall, means for rotating said hopper, a gate for said passageway, a washer holder located on the outside of the wall of the hopper adjacent the passageway, means for opening the gate and delivering washers in succession through the passageway to the holder, and means for arranging the washers so delivered in stacked relation.

12. A machine for separating dished washers from a heterogeneously arranged pile thereof, having in combination, a hopper for washers, said hopper having a passageway through its wall, a gate for said passageway, a washer holder located on the outside of the wall of the hopper adjacent the passageway, positive means for opening the gate and delivering washers in succession through the passageway to the holder, and means for successively impaling the washers after they have been delivered to the holder.

13. A machine for separating dished washers from a heterogeneously arranged pile thereof, having in combination, a hopper for washers, said hopper having a passageway through the wall thereof, a gate for said passageway, a washer holder located outside the hopper adjacent to the passageway, means for positioning washers successively at the edge of the passageway with one of their sides resting against the gate, and means for opening the gate intermittently to permit the washers to be delivered to the holder.

14. A machine for separating dished washers from a heterogeneously arranged pile thereof, having in combination, a hopper for washers, said hopper having a passageway through the wall thereof, a gate for said passageway, a washer holder located outside the hopper adjacent to the passageway, means for positioning washers successively at the edge of the passageway with one of their sides resting against the gate, means for opening the gate intermittently to permit the washers to be delivered to the holder, and means for arranging the washers so delivered in stacked relation.

15. A machine for separating dished washers from a heterogeneously arranged pile thereof, having in combination, a hopper for washers, said hopper having a passageway through the wall thereof, a gate for said passageway, a washer holder located outside the hopper adjacent to the passageway, means for positioning washers successively at the edge of the passageway with one of their sides resting against the gate, means for opening the gate intermittently to permit the washers to be delivered to the holder, and means for successively impaling the washers.

16. A machine for separating dished washers from a heterogeneously arranged pile thereof, having in combination, a hopper for washers, said hopper having a passageway through the wall thereof, a gate for said passageway, a washer holder located on the outside of the wall of the hopper adjacent to the passageway, means for positioning washers successively at the edge of the passageway with one of their sides resting against the gate, and means for opening the gate intermittently to permit the washers to be delivered to the holder.

17. A machine for separating dished washers from a heterogeneously arranged pile thereof, having in combination, a hopper for washers, said hopper having a passageway through the wall thereof, a gate for said passageway, a washer holder located outside the hopper adjacent to the passageway, means for positioning washers successively at the edge of the passageway with one of their sides resting against the gate, means for opening the gate intermittently to permit the washers to be delivered to the holder, and means for arranging the washers so delivered in stacked relation.

18. A machine for separating dished washers from a heterogeneously arranged pile thereof, having in combination, a rotatably mounted hopper for washers, said hopper having a passageway through the wall thereof, means for rotating said hopper, a gate for said passageway, a washer holder located on the outside of the wall of the hopper adjacent to the passageway, means for positioning washers successively at the edge of the passageway with one of their sides resting against the gate, and means for successively impaling the washers.

19. A machine for separating dished washers from a heterogeneously arranged pile thereof, having in combination, a hopper for washers, said hopper having a passageway through its wall, an edge of the wall adjacent to the opening having a thickness substantially equal to that of the edge of a washer, a gate for the passageway, means for oscillating the hopper to cause washers to be supported on said edge of the wall with one of their faces resting against the gate, and means for opening the gate to permit the washers so supported to be delivered from the hopper.

20. A machine for separating dished washers from a heterogeneously arranged pile thereof, having in combination, a hopper for washers, said hopper having a passageway through its wall, an edge of the wall adjacent to the opening having a thickness substantially equal to that of the edge of a washer, a gate for the passageway, means for oscillating the hopper to cause washers to be supported on said edge of the wall with one of their faces resting against the gate, a holder located on the outside of the hopper adjacent to the passageway, and means for opening the gate to permit the washers to be delivered through the passageway into the holder.

21. A machine for separating dished washers from a heterogeneously arranged pile thereof, having in combination, a hopper for washers having a passageway through a wall thereof, a stationary impaling member, means for oscillating the hopper, and means cooperating with the hopper for causing washers first to move through the passageway and then to be threaded upon the impaling member.

22. A machine for separating dished washers from a heterogeneously arranged pile thereof, having in combination, a hopper for washers, said hopper having a passageway through a wall thereof, a gate for said passageway, a holder for a washer located on the outside of said hopper, means for oscillating the hopper and for opening the gate to deliver a washer to the washer holder, and an impaling member having an end located in the path of oscillation of the washer holder.

23. A machine for separating dished washers from a heterogeneously arranged pile thereof, having in combination, a hopper for washers, said hopper having a passageway in a wall thereof, a washer holder located on the outside of the wall of the hopper adjacent to the passageway, a gate for the passageway, means for oscillating the hopper to bring the passageway into elevated position, means for opening the gate to deliver a washer to the washer holder, an impaling member located in the path of movement of the holder, a retainer to prevent the washer from escaping from the holder when the holder is swung down, and means for moving the retainer to inoperative position to permit the impaling member to impale the washer and remove it from the holder.

24. A machine for separating dished washers from a heterogeneously arranged pile thereof, having in combination, a hopper for washers, impaling means, means for oscillating the hopper first to position some of the washers with corresponding surfaces facing in the same direction and then to transfer these washers to the impaling means.

25. A machine for separating dished washers from a heterogeneously arranged pile thereof, having in combination, a pin, means for threading washers upon the pin, and means for holding the pin in fixed position while permitting an endless supply of washers to be threaded upon it.

26. A machine for separating dished washers from a heterogeneously arranged pile thereof, having in combination, a pin, means for threading washers upon the pin, and means for holding the pin in fixed position while permitting an endless supply of washers to be threaded upon it, said means comprising two pairs of grippers and means for releasing said grippers alternately.

27. A machine for separating dished washers from a heterogeneously arranged pile thereof, having in combination, a pin, means for threading washers upon the pin, and means for holding the pin in fixed position while permitting an endless supply of washers to be threaded upon it, said means comprising two pairs of gripping plates, springs tending at all times to hold the plates in contact with the pin, and means for separating the plates of each pair in succession.

28. A machine for separating dished washers from a heterogeneously arranged pile thereof, having in combination, an elongated member, means for threading washers upon said member, means for gripping the member at two localities and means for releasing the gripping means alternately to permit washers to slide down the member past the gripping means while still maintaining the member in fixed position.

29. A machine for separating dished washers from a heterogeneously arranged pile thereof, having in combination, an elongated member, means for threading washers upon said member, means for gripping said member at two spaced localities near its upper end, and means for operating the two gripping means to cause them to release and to grip the member in succession whereby washers threaded upon the upper end of the member may slide down said member past both gripping means and collect upon the lower portion of said member while the upper end of said member is held at all times in fixed position to receive more washers.

30. A member adapted to receive a stack of washers, said member comprising an upper portion, a lower portion and a joint connecting said portions whereby the portions may be positioned at an angle to each other to prevent washers from sliding from the upper portion down upon the lower portion.

31. A member adapted to receive a stack of washers, said member comprising an upper portion, a lower portion adapted to rest upon a support, and a joint between the portions, whereby, when the lower portion is swung from off its support into a position inclined to that of the upper portion, the washers on the lower portion may be slid off into a magazine or other receptacle while the washers on the upper portion are prevented from sliding down upon the lower portion.

32. A member adapted to receive a stack of washers, said member comprising an impaling pin, a flexible wire attached to the lower end of the pin, and a jointed rod attached to the lower end of the wire.

33. A machine for separating dished washers from a heterogeneously arranged pile thereof, having in combination, a hopper for washers, said hopper having a passageway through a wall thereof, a holder located on the outside of the wall of the hopper adjacent to the opening, means for oscillating the hopper to deliver a washer to the holder when the holder is in elevated position, and a retainer for preventing the washer from sliding out of the holder during the lowering of said holder.

34. A machine for separating dished washers from a heterogeneously arranged pile thereof, having in combination, a hopper for washers, means for oscillating the hopper, and means for striking a blow upon the wall of the hopper to ensure a supply of washers in the lower portion of the hopper.

35. A machine for separating dished washers from a heterogeneously arranged pile thereof, comprising a hopper having an opening in its wall, an edge of said opening being of substantially the same order of thickness as that of the edges of the washers, a gate for closing said opening, said gate being constructed and arranged to have its inner surface register with the outer surface of the hopper when closed, means for rotating said hopper with said gate closed from a position wherein some of the contained washers are supported upon said gate to a position wherein one of the washers may be supported edgewise upon said edge of said opening with its concave side resting lightly against said gate, and means for opening the gate when the hopper is in said latter position to deliver the washer.

36. A machine of the character described, comprising a hopper mounted for oscillatory movement, and means co-operating with said hopper for separating definitely positioned washers from a heterogeneously arranged pile of washers within the hopper upon movement of the hopper in one direction, and for delivering the separated washers in a definite position upon movement of the hopper in the opposite direction.

37. A machine for separating dished washers from a heterogeneously arranged pile thereof and for stacking the washers in nested relation, comprising a hopper mounted for oscillatory movement, said hopper having an opening in its wall, a closure member for said opening, said opening and said closure member being constructed and arranged to separate definitely positioned washers from the pile of washers within the hopper by the movement of the hopper in one direction, a device for receiving the separated washers and for maintaining them in nested relation, and means for delivering the separated washers from said hopper to said receiving device upon movement of the hopper in the opposite direction.

38. A machine for separating dished washers from a heterogeneously arranged pile thereof and for stacking the washers in nested relation, comprising a hopper mounted for oscillatory movement, a device for receiving definitely positioned washers and for maintaining them in stacked relation, means associated with said hopper and effective upon the movement of the hopper in one direction to select and to separate from the pile of washers within the hopper those washers which are properly positioned for stacking, and means associated with said hopper and effective upon movement of the hopper in the opposite direction to deliver the separated washers to said receiving device.

In testimony whereof I have signed my name to this specification.

SIDNEY J. FINN.